United States Patent [19]

Maurer

[11] 3,747,406

[45] July 24, 1973

[54] FLUID FLOWMETER

[76] Inventor: Robert Maurer, 69, Torby Rd., Rayners Ln., Harrow, England

[22] Filed: July 29, 1971

[21] Appl. No.: 167,120

[52] U.S. Cl. .................. 73/205 R, 73/206, 73/211
[51] Int. Cl. ............................................. G01f 1/04
[58] Field of Search ............ 73/211, 206, 212–214, 73/198, 205 R, 205 D, 182, 183

[56] References Cited
UNITED STATES PATENTS

| | | | |
|---|---|---|---|
| 2,454,007 | 11/1948 | Reilly et al. | 73/183 |
| 2,669,873 | 2/1954 | Gardner et al. | 73/205 R |
| 2,357,199 | 8/1944 | Holst | 73/205 R |

Primary Examiner—James J. Gill
Attorney—E. F. Wenderoth et al.

[57] ABSTRACT

A fluid flowmeter of the pitometer log kind in which an auxiliary pump is driven to balance off the pressure difference detected as a result of the fluid flow through a constriction, the speed of the pump being nominally related to the rate of fluid flow, there being provided (a) correction means such as a bleed valve for affecting the pump output pressure and control means to control the correction means for linearising the flowmeter characteristic and (b) a synchronous driving motor for the pump driven by a pulse generator, flow rate indication being derived from the pulse generator output.

7 Claims, 6 Drawing Figures

FLUID FLOWMETER

The invention relates to a fluid flowmeter of the pitometer log kind. In such a flowmeter, flow in a conduit is measured by passing the fluid through a constriction in the conduit, tapping the fluid pressure on the upstream and downstream sides of the constriction and driving an auxiliary pump to balance the said pressure, the rate at which the pump requires to be driven to maintain balance being used as an indication of the flow rate.

There are disadvantages associated with pitometer log flowmeters which the present invention, in its various aspects, seeks to overcome. Firstly, it is found that the relationship which makes pump speed directly proportional to flow rate does not always hold. One reason for this is that in general the proportional relationship applies for large values of Reynold's number only. At low flow rates, Reynold's number falls and the proportional relationship does not hold. This gives an objectionable non-linearity in the flowmeter characteristic. Under some circumstances, non-linearity can also be experienced for other reasons, not only for low flow rates but also perhaps for intermediate and high flow rates.

According to one aspect of the invention there is provided a fluid flowmeter of the pitometer log kind comprising a conduit through which is passed fluid the flow rate of which is to be measured; a constriction in the conduit; a first duct communicating with the fluid on the upstream side of the constriction; a second duct communicating with the fluid on the downstream side of the constriction; a rotary pump having an inlet coupled to the second duct and an outlet; a balancing chamber having a diaphragm, the chamber on one side of the diaphragm communicating with the pump outlet and on the other side of the diaphragm communicating with the first duct; a motor for driving the pump; a sensor responsive to the diaphragm position; means coupling the sensor to control the motor in such a way as to maintain equal pressures on the two sides of the diaphragm; output means for giving an indication related to the number of revolutions made by the pump; correction means at the pump outlet for reducing, for a given rotational speed, the output pressure of the pump; and control means for controlling the operation of the correction means in accordance with the fluid flow rate. With this arrangement the flowmeter characteristic can be simply and accurately linearised.

The correction means may comprise a bleed valve at the pump outlet whereby fluid is leaked from the pump at selected flow rates. In a preferred embodiment of the invention the flowmeter is adapted to compensate for the change in Reynold's number mentioned above, and to this end the bleed valve leaks more when flow rate is low. This may be achieved by opening the valve only at the low flow rate end of the range or perhaps by closing the valve only at the high flow rate end of the range.

If the pump is a centrifugal pump, as is preferred, the correction means may comprise instead a movable fluid pick-off capable of being moved along a radius of the impeller for picking off a suitable output pressure for application to the pump outlet.

The control means may comprise an actuator operable by fluid pressure, the actuator having a preset pressure level so that it operates only when the differential pressure across a constriction in the main flow system falls below the preset level, for example. On actuation the actuator moves the valve or pick-off.

Alternatively the control means may be electrical, being effective to operate a solenoid which actuates the correction means when the flow rate is low. An electrical signal for causing actuation may be derived, for example, from the drive for the motor or from a tachometer output of the motor, the motor speed being substantially proportional to flow rate.

The control may be a simple on/off control effective simply to open or shut a bleed valve. Alternatively, however, the control may be a proportional control effective to give a progressive effect on the output of the pump. For example, the correction means may be a progressively controlled valve or a parallel set of on/off valves set to operate at different flow rates. The continuously movable pick-off described above lends itself to progressive control.

Another disadvantage of the pitometer log flowmeter is that hitherto it has been customary to provide an analogue drive for the motor and to use an expensive pick-off device and indicator equipment to give the required indications of pump revolution rate and/or total.

According to another aspect of the invention there is provided a fluid flowmeter of the pitometer log kind comprising a conduit through which is passed fluid the flow rate of which is to be measured; a constriction in the conduit; a first duct communicating with the fluid on the upstream side of the constriction; a second duct communicating with the fluid on the downstream side of the constriction; a rotary pump having an inlet coupled to the second duct and an outlet; a balancing chamber having a diaphragm, the chamber on one side of the diaphragm communicating with the pump outlet and on the other side of the diaphragm communicating with the first duct; a motor for driving the pump; a sensor responsive to the diaphragm position; a pulse generator responsive to the sensor output and effective to generate a pulse rate output proportional thereto; means coupling the pulse generator output to drive the motor, the motor being a synchronous motor, the arrangement being such that the motor is thereby driven to maintain equal pressures on the two sides of the diaphragm; and digital indicator means responsive to the pulse output from the pulse generator to give an indication related to the number of revolutions made by the pump. As used herein "synchronous motor" includes within its scope a stepping motor. This arrangement allows accurate control coupled with inexpensive digital read-out facilities.

The indicator means may be arranged to give a pulse rate indication representative of flow rate, a pulse count indicator representative of total flow, or both. An analogue indication may be given if required by means of a digital-to-analogue converter and indicator.

The invention will further be described with reference to the accompanying drawings, of which:

Figure 1:
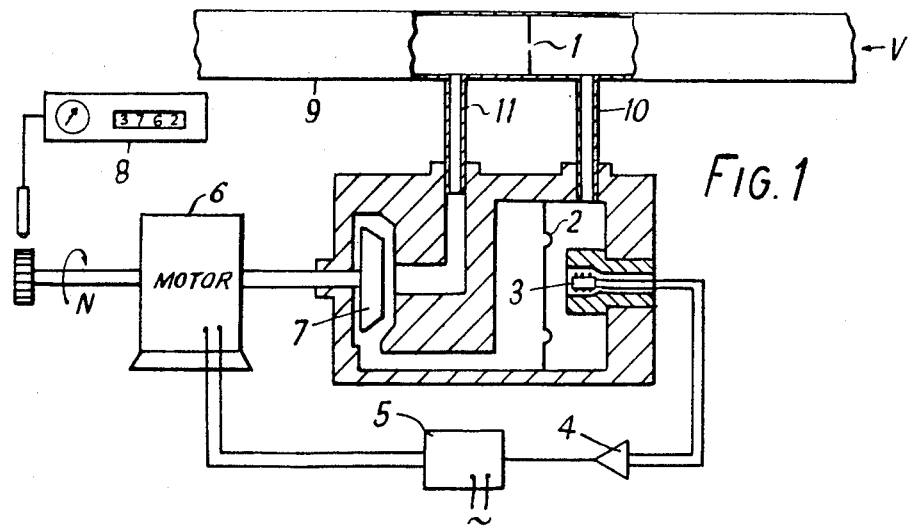
FIG. 1 is a schematic diagram illustrating, for explanatory purposes, a flowmeter of the pitometer log kind which does not embody the invention.

Referring to FIG. 1 there is shown a flowmeter of the pitometer log kind. The fluid the rate of which is to be measured flows in a conduit 9 in the direction shown by arrow V.

A pressure drop is created by the fluid stream flowing through an orifice plate 1, (alternatively a venturi or pitot-static tube). The pressure drop causes a diaphragm 2 (preferably rateless) to move to the left. A resultant output signal from a position sensor 3, caused by the movement of the diaphragm is fed after amplification in an amplifier 4 into a controller 5. The controller is effective to drive a motor 6 and hence the impeller 7 of a centrifugal pump coupled thereto so that the pressure developed by the pump arrests any further movement of the diaphragm 2. At this point the pressure rise developed by the pump ($\Delta pr$) equals the pressure drop ($\Delta pr$) across the orifice plate, i.e., $$\Delta pr = \Delta po$$
$$K\rho N^2 = K\rho V^2$$
$$\therefore N = KV$$

where $\rho$ = fluid density, $V$ = fluid velocity; and $N$ = rotational speed of motor/pump. Thus the rotational speed of the pump is proportional to the velocity of the fluid in the duct and the integrated flow is obtained by counting the total number of pump revolutions in a ratemeter and totaliser 8.

Although the instrument as described above yields a very accurate relationship between the pressure drop across it and the velocity output, a discrepancy does sometimes occur between the relationship of $V$ (fluid velocity), and $N$ (pump velocity).

The main reason for this disparity between $V$ and $N$, is that the relationship between $\Delta p$ and $V$, i.e. $\Delta p = K\rho V^2$, only really holds good for large values of the Reynold's number. At low Reynold's numbers, or as is often the case at the low end of the flow range to be measured, the law $\Delta p = K\rho V^2$, approximates to $\Delta p = K\rho V$. However, as the relationship $\Delta p = K N^2$ holds good at the low rotational speed values, a divergence occurs between $V$ and $N$.

It is therefore an object of this invention to provide means whereby the discrepancy between the two signals may be eliminated or substantially reduced.

Figure 2:
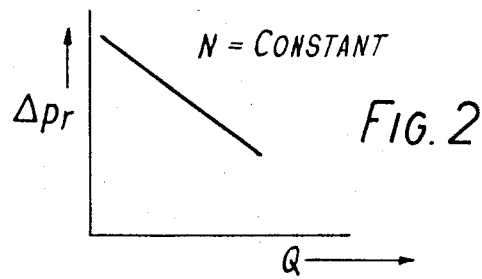
FIG. 2 is a graph illustrating a characteristic of the flowmeter of FIG. 1.

As the characteristic between the pressure $\Delta p$ developed by the pump impeller and the flow through the pump (Q) follows a negative curve (FIG. 2), it can be seen that for the same rotational speed the pressure developed across the pump can be varied by changing the quantity of fluid passing through the pump. Use is made of this characteristic to apply a correction factor to the rotational output speed of the pump.

Figure 3:
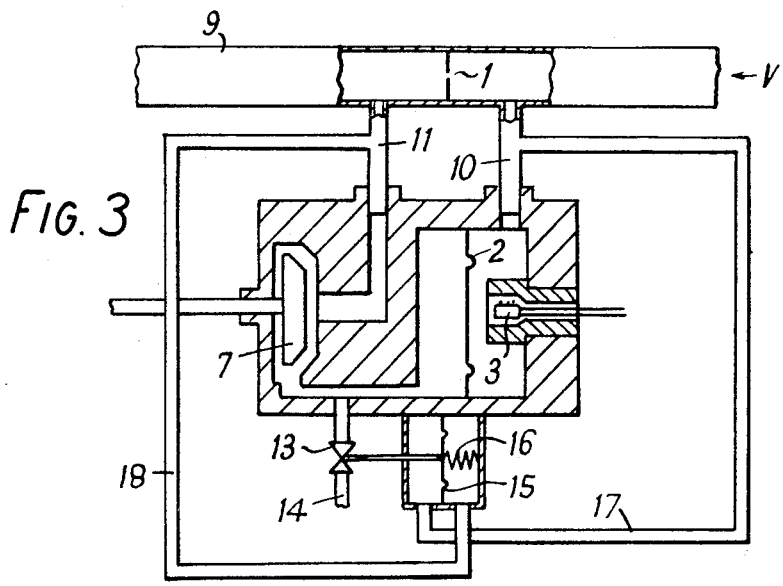
FIG. 3 is a schematic diagram of a modification in accordance with the invention of the pump of FIG. 1.

Thus, referring to FIG. 3 there is shown means for applying a correction factor to the pump. A bleed valve 13 is connected in a duct 14 leading from the pump outlet. When the valve 13 is opened the output pressure from the pump is reduced and the opening of the valve is effected automatically when the fluid flow rate falls below a preset value. In the embodiment of FIG. 3 the control for the valve is effected by a hydraulic actuator comprising a diaphragm 15 loaded by a spring 16. The two sides of the diaphragm are connected respectively by tubes 17 and 18 to the ducts 10 and 11 on either side of the orifice plate 1. When the flow in conduit 9 falls below a predetermined level the pressure differential between ducts 10 and 11 will also fall below a predetermined level and the diaphragm 15 will be deflected sufficiently by spring 16 to open valve 13. Thus the required correction of the pump characteristic is effected automatically at low flow rates.

Figure 4:
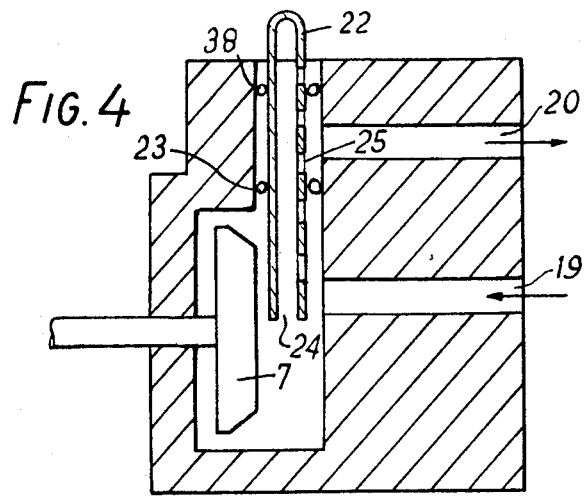
FIG. 4 is a diagram of an alternative form of correction means for use in accordance with the invention.

FIG. 4 shows an alternative form of correcting means. In the embodiment of this Figure the inlet for the impeller 7 is shown at 19 and the outlet which communicates with the diaphragm chamber is shown at 20, being a duct which communicates with a radial duct 21. Movable linearly in duct 21 is a pick-off tube 22 which is closed at one end and open at the other end 24. The tube has a number of holes 25 along its length. Tube 22 is sealed in duct 21 by O-ring seals 23. The radial position of the end 24 of tube 22 with respect to the impeller determines the output pressure from the pump. The nearer end 24 is to the centre of the impeller, the less is the pressure rise. The tube 22 is moved automatically by means (not shown) which may be similar to the actuator of FIG. 3 so that the pump output pressure is reduced or increased to accommodate the changes in Reynold's number. Actuation of the valve arrangement can be carried out electrically by a solenoid type arrangement, the operating signal therefor being controlled by the rotational speed of the motor/pump, possibly by the voltage output from an attached tachogenerator.

Figure 5:
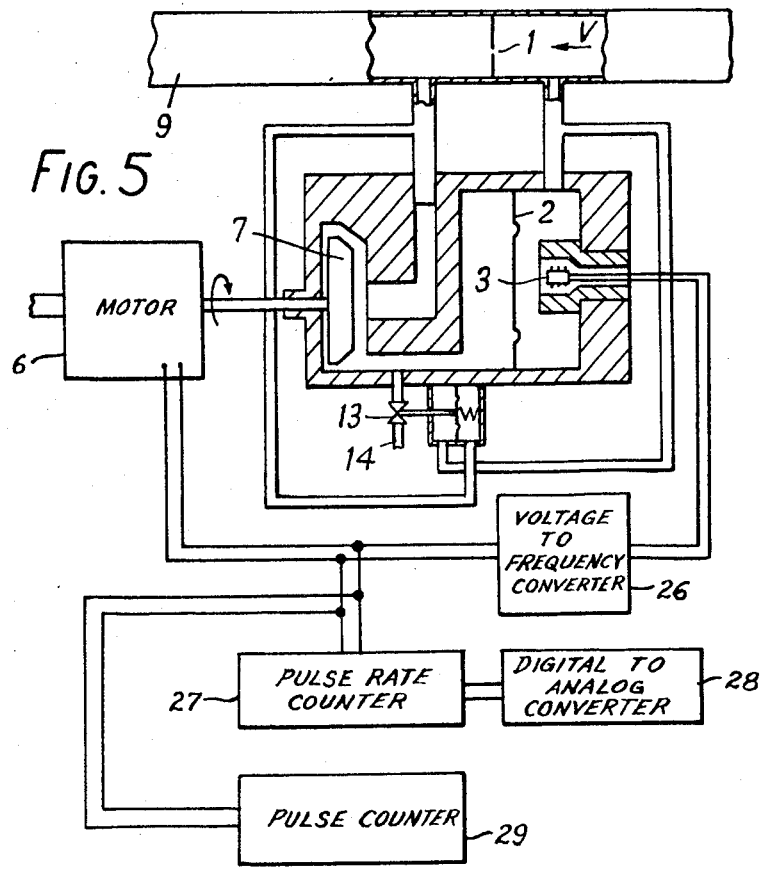
FIG. 5 is a block diagram of a preferred embodiment of the invention.

FIG. 5 shows an embodiment of the invention which has the correction means of FIG. 3 and which also has a digital drive arrangement for the motor 6 and digital indicating arrangement in accordance with another aspect of the present invention. The digital drive and indicating arrangement is identical to that shown in FIG. 6, which illustrates another embodiment of the invention constituted by the flow-meter of FIG. 5 without the correction means.

Figure 6:
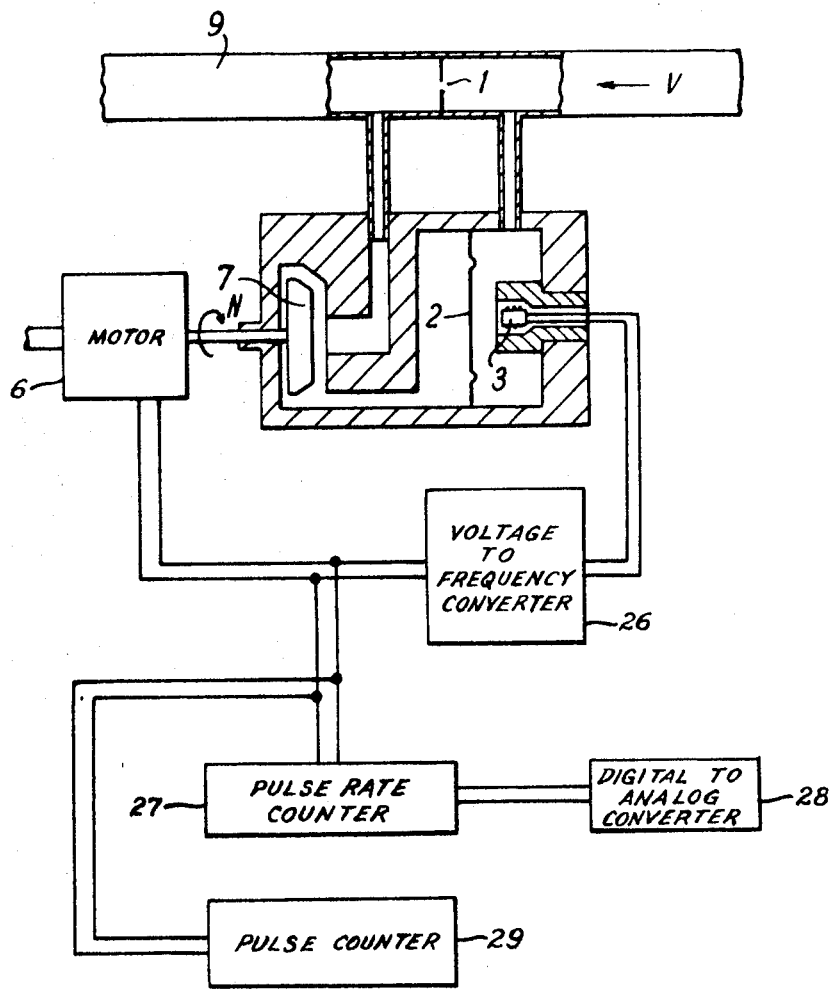
FIG. 6 is a block diagram of another embodiment of the invention.

Referring now to FIG. 6 the sensor 3 is connected to the input of a voltage-to-frequency converter 26 which converts the analogue output voltage from the sensor to a train of pulses of which the frequency is proportional to the sensor voltage output. Effectively, therefore, the converter 26 is a controlled pulse generator.

Pulses from converter 26 are fed to drive motor 6 which in this embodiment is a stepping motor. The motor steps are increment in response to each pulse. The number of revolutions of the pump impeller is directly proportional to the number of pulses from the converter 26. As before, the arrangement is such as to ensure that the pressure differential across diaphragm 2 is balanced. Thus, the pulse rate output from converter 26 is proportional to the fluid flow rate.

A digital indication of fluid flow rate is given by a pulse repetition rate counter 27 connected to the output of converter 26. If required, an analogue output indication can also be given by a digital-to-analogue converter 28 coupled to the counter 27. Furthermore, if required, a total flow indication can be given by a pulse counter 29 which simply counts the output irrespective of pulse rate.

The invention is not restricted to the details of the specific embodiments described above with reference to the drawings. For example, as was mentioned above, control of the correction means may be effected electrically instead of hydraulically. Furthermore, the correction means may take other forms, as, for example, a spoiler blade near the rim of the impeller, the blade being moved radially to spoil the flow more or less and this affects the efficiency of the impeller.

I claim:

1. A fluid flowmeter of the pitometer log kind comprising a conduit through which is passed fluid the flow rate of which is to be measured; a constriction in the conduit; a first duct communicating with the fluid on the upstream side of the constriction; a second duct communicating with the fluid on the downstream side of the constriction; a rotary pump having an inlet coupled to the second duct and an outlet; a balancing chamber having a diaphragm, the chamber on one side of the diaphragm communicating with the pump outlet and on the other side of the diaphragm commuciating with the first duct; a motor for driving the pump; a sensor responsive to the diaphragm position; a pulse generator responsive to the sensor output and effective to generate a pulse rate output proportional thereto; means coupling the pulse generator output to drive the motor, the motor being a synchronous motor, the arrangement being such that the motor is thereby driven to maintain equal pressures on the two sides of the diaphragm; and digital indicator means responsive to the pulse output from the pulse generator to give an indication related to the number of revolutions made by the pump.

2. A flowmeter as claimed in claim 1 wherein the indicator means is arranged to give a pulse rate indication representative of flow rate and a pulse count indication representative of total flow.

3. A fluid flowmeter of the pitometer log kind comprising a conduit through which is passed fluid, the flow rate of which is to be measured; a constriction in the conduit; a first duct communicating with the fluid on the upstream side of the constriction; a second duct communicating with the fluid on the downstream side of the constriction; a rotary pump having an inlet coupled to the second duct and an outlet; a balancing chamber having a diaphragm, the chamber on one side of the diaphragm communicating with the pump outlet and on the other side of the diaphragm communicating with the first duct; a motor for driving the pump; a sensor reponsive to the diaphragm position; means coupling the sensor to control the motor in such a way as to maintain equal pressures on the two sides of the diaphragm; output means for giving an indication related to the number of revolutions made by the pump; a bleed valve at the pump outlet for reducing, for a given rotational speed, the output pressure of the pump; and control means responsive to the fluid flow rate for controlling the operation of the bleed valve so as to leak fluid from the pump at low flow rates.

4. A fluid flowmeter of the pitometer log kind comprising a conduit through which is passed fluid, the flow rate of which is to be measured; a constriction in the conduit; a first duct communicating with the fluid on the upstream side of the constriction; a second duct communicating with the fluid on the downstream side of the constriction; a centrifugal impeller pump having an inlet coupled to the second duct and an outlet; a balancing chamber having a diaphragm, the chamber on one side of the diaphragm communicating with the pump outlet and on the other side of the diaphragm communicating with the first duct; a motor for driving the pump; a sensor responsive to the diaphragm position; means coupling the sensor to control the motor in such a way as to maintain equal pressures on the two sides of the diaphragm; output means for giving an indication related to the number of revolutions made by the pump; a movable fluid pick-off means capable of being moved along an impeller radius for picking off a suitable output pressure for application to the pump outlet and thereby reducing, for a given rotational speed, the output pressure of the pump; and control means responsive to the fluid flow rate for controlling the operation of the movable fluid pick-off means.

5. A fluid flowmeter of the pitometer log kind comprising a conduit through which is passed fluid, the flow rate of which is to be measured; a constriction in the conduit; a first duct communicating with the fluid on the upstream side of the constriction; a second cut communicating with the fluid on the downstream side of the constriction; a rotary pump having an inlet coupled to the second duct and an outlet; a balancing chamber having a diaphragm, the chamber on one side of the diaphragm communicating with the pump outlet and on the other side of the diaphragm communicating with the first duct; a motor for driving the pump; a sensor responsive to the diaphragm position; means coupling the sensor to control the motor in such a way as to maintain equal pressures on the two sides of the diaphragm; output means for giving an indication related to the number of revolutions made by the pump; correction means at the pump outlet for reducing, for a given rotational speed, the output pressure of the pump; and control means responsive to the fluid flow rate for controlling the operation of the correction means, said control means comprising an actuator operable by fluid pressure, the actuator having a chamber; a diaphragm dividing the chamber, spring means acting on the diaphragm; coupling means coupling the diaphragm to operate the correction means; fluid coupling means coupling the part of the chamber on one side of the diaphragm to the conducit on one side of the constriction; and fluid coupling means coupling the part of the chamber on the other side of the diaphragm to the conduit on the other side of the constriction, the actuator thus operating the correction means only when the differential pressure across the constriction falls below a predetermined level.

6. A fluid flowmeter of the pitometer log kind comprising a conduit through which is passed fluid, the flow rate of which is to be measured; a constriction in the conduit; a first duct communicating with the fluid on the upstream side of the constriction; a second duct communicating with the fluid on the downstream side of the constriction; a rotary pump having an inlet coupled to the second duct and an outlet; a balancing chamber having a diaphragm, the chamber on one side of the diaphragm communicaitng with the pump outlet and on the other side of the diaphragm communicating with the first duct; a motor for driving the pump; a sensor responsive to the diaphragm position; a pulse generator responsive to the sensor output and effective to generate a pulse rate output proportional thereto; means coupling the pulse generator output to drive the motor, the motor being a synchronous motor, the arrangement being such that the motor is thereby driven to maintain equal pressure on the two sides of the diaphragm; and digital indicator means responsive to the pulse output from the pulse generator to give an indication related to the number of revolutions made by the pump.

7. A flowmeter as claimed in claim 6 wherein the indicator means is arranged to give a pulse rate indication representative of flow rate and a pulse count indication representative of total flow.

* * * * *